United States Patent
Mani et al.

(10) Patent No.: US 7,975,921 B2
(45) Date of Patent: Jul. 12, 2011

(54) NFC READER HAVING A PASSIVE OPERATING MODE WITH LOW ELECTRICAL CONSUMPTION

(75) Inventors: Christophe Mani, Cavaillon (FR); Francis Dell'Ova, Aix en Provence (FR); Pierre Rizzo, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 510 days.

(21) Appl. No.: 12/103,570

(22) Filed: Apr. 15, 2008

(65) Prior Publication Data

US 2009/0101716 A1   Apr. 23, 2009

Related U.S. Application Data

(63) Continuation-in-part of application No. PCT/FR2006/002013, filed on Sep. 1, 2006.

(30) Foreign Application Priority Data

Oct. 17, 2005   (FR) ...................................... 0510590

(51) Int. Cl.
*G06K 7/06* (2006.01)
(52) U.S. Cl. ........................................ 235/441; 235/492
(58) Field of Classification Search .................. 235/487, 235/492, 441
See application file for complete search history.

(56) References Cited

U.S. PATENT DOCUMENTS

| | | | | |
|---|---|---|---|---|
| 5,247,164 | A | * | 9/1993 | Takahashi ...................... 235/492 |
| 7,162,408 | B2 | * | 1/2007 | Kashyap et al. ................. 703/24 |
| 7,775,442 | B2 | * | 8/2010 | Saarisalo ....................... 235/487 |
| 2005/0222961 | A1 | | 10/2005 | Staib et al. |
| 2007/0026893 | A1 | * | 2/2007 | Sakamoto et al. ............ 455/558 |
| 2009/0088077 | A1 | * | 4/2009 | Brown et al. ................ 455/41.2 |
| 2009/0093272 | A1 | * | 4/2009 | Saarisalo et al. .............. 455/558 |
| 2009/0098825 | A1 | * | 4/2009 | Huomo et al. ............... 455/41.1 |
| 2009/0101716 | A1 | * | 4/2009 | Mani et al. .................... 235/441 |
| 2009/0291634 | A1 | * | 11/2009 | Saarisalo ..................... 455/41.1 |

FOREIGN PATENT DOCUMENTS

WO   WO 2005/041119 A1 *   5/2005
WO       2007/045732 A1       4/2007

OTHER PUBLICATIONS

ECMA: Standard ECMA-340, "Near Field Communication Interface and Protocol (NFCIP-1)," 2nd Edition, Dec. 2004.

(Continued)

*Primary Examiner* — Thien M. Le
*Assistant Examiner* — Christopher Stanford
(74) *Attorney, Agent, or Firm* — Lisa K. Jorgenson; Timothy L. Boller; Seed IP Law Group PLLC (57) ABSTRACT

An inductive coupling reader includes a passive interface circuit for modulating the impedance of an antenna circuit and extracting from the antenna circuit a data signal and a RF clock signal, and circuitry for coupling the reader to a removable security module. The reader includes an emulation circuit for opening a RF transmission channel with another reader, a non-removable electrical link linking the emulation circuit to the passive interface circuit, by which the data signal and the RF clock signal are supplied to the emulation circuit, and a data bus clocked by a bus clock signal having a frequency inferior to the frequency of the RF clock signal, for linking the emulation circuit to the removable security module. The reader has low electrical consumption.

33 Claims, 4 Drawing Sheets

OTHER PUBLICATIONS

Integrated Circuits: Short Form Specification, "Near Field Communication PN53 uC based Transmission Module," Philips Semiconductor, Feb. 2004.

International Standard, ISO/IEC 18092, "Information Technology—Telecommunications and Information Exchange Between Systems—Near Field Communication—Interface and Protocol (NFCIP-1)," First Edition, Apr. 1, 2004.

ISO/IEC JTC1/SC17 N 1531, Reference No. ISO/IEC FCD 14443-3, "Identification Cards—Contactless Integrated Circuit(s) cards—Proximity Cards," Jun. 11, 1999.

ISO/IEC Final Committee Draft 15693-1, "Identification Cards—Contactless Integrated Circuit(s) Cards," 2000.

Philips, "S2C Interface for NFC—Adding a General Purpose Interface Between NF and Secure IC to Secure NFC," Survey V1.0, Jan. 21, 2005.

ISO/IEC 7816-6:2004(E) "Identification cards—Integrated circuit cards—Part 6: Interindustry data elements for interchange" Second edition: May 15, 2004.

ISO/IEC 7816-6:2004 Technical Corrigendum 1 "Identification cards—Integrated circuit cards—Part 6: Interindustry data elements for interchange", Published: Jun. 15, 2006.

* cited by examiner

NFC READER HAVING A PASSIVE OPERATING MODE WITH LOW ELECTRICAL CONSUMPTION

TECHNICAL FIELD

The present disclosure generally relates to methods of data transmission by inductive coupling, and more particularly but not exclusively contactless integrated circuits readers operating by inductive coupling. These readers have various designations, such as "PCD" (Proximity Coupling Device), "VCD" (Vicinity Coupling Device), "inductive couplers"....

BACKGROUND INFORMATION

The methods of data transmission by inductive coupling were originally developed for RFID (Radio Frequency Identification) applications, in order to read contactless electronic tags (products identification) or contactless badges (people identification). Because of the technological advances of these last years, these methods are now easily implemented and are considered as forming an outright technique of data transmission, which is not only reserved for identification applications but can also be used to create a RF transmission channel between two devices to make various kinds of proximity transactions.

Thus, although originally provided for allowing data exchange between a contactless integrated circuit and an inductive coupling reader, it seemed advantageous to apply these methods to the data exchange between inductive coupling readers. More particularly, two communication "models" have been considered to establish a RF transmission channel between two readers.

According to the first model, each reader alternately goes into an active mode or a passive mode depending on whether it must send data to the other reader or receive data from the other reader. Thus, the reader which is to send data emits an alternating magnetic field oscillating at a carrier frequency Fc (13.56 MHz according to ISO/IEC 14443 and ISO/IEC 15693 standards) and modulates the amplitude of the magnetic field as if it addressed a contactless integrated circuit. The reader which is to receive the data does not emit magnetic field and receives an antenna signal, image of the magnetic field.

According to the second model, one of the readers goes into the active mode and the other reader goes into the passive mode during all the communication. The transmission of data from the reader in active mode to the reader in passive mode is as previously ensured by modulating the amplitude of the magnetic field emitted. The data transmission from the reader in passive mode to the reader in active mode is ensured by modulating the impedance of the antenna coil of the reader in passive mode (that is also called retromodulation). This impedance modulation produces, in the antenna circuit of the reader in active mode, a load modulation signal which is mixed with the excitation signal and is extracted by means of adapted filters.

The passive mode of model 2, unlike the alternating active/passive mode of model 1, is called "emulation" mode. Indeed, the reader in passive mode "behaves" like a contactless integrated circuit, to receive data as well as to send data.

These methods of data transmission between inductive coupling readers thus offer various prospects of application. The industrial community calls them "NFC" (Near Field Communication) and a forum is dedicated to them (http://www.nfc-forum.org/home). NFC is defined as an open platform about a technology defined by the documents ECMA 340 http://www.ecma-international.org/publications/standards/Standard.htm), ETSI TS 102 190 V1.1.1 and ISO/IEC 18092. These documents define modulation schemes, coding, data transfer speeds, and frame formats for the RF interface of NFC readers, as well as communication initialization protocols required for the control of data collisions during the initialization, in active mode as well as in passive mode. However, the designation "NFC" in the present application more generally refers to a reader able to dialogue with another reader.

In parallel to the development of the NFC technology, it has become common to integrate inductive coupling readers in portable electronic devices like mobile phones, PDAs (Personal Digital Assistants) and portable computers. In these applications, the implementation of the NFC technique is of major interest since the portable electronic device can then exchange data with another portable electronic device by inductive coupling. The NFC technique thus provides the portable electronic devices with advanced functionalities in addition to GSM (Global System for Mobile Communications), Bluetooth® and WiFi functionalities, with the possibility of providing interdependences between these functionalities, for example the use of a NFC communication for initializing a Bluetooth® communication between two mobiles.

The implementation of the emulation mode in a NFC reader built in a portable electronic device offers as additional advantage the fact that the portable device becomes usable like a contactless chip card, in access control applications or identification applications, for example controlling the access to public transport services like metro, buses etc. As users must pay for these applications, they must be secure. That implies that the operation of the NFC reader is subjected to the presence, in the reader, of a removable security module, provided to the subscriber by the service provider(s) and which must be inserted in the reader.

In addition to these security constraints which impose the provision of a removable security module, it is wished that the NFC reader in the emulation mode can be electrically powered by the magnetic field emitted by the reader in active mode. Indeed, the battery of the device in which the reader is built in should not be used during a communication, to preserve the charge of the battery as well as to allow the emulation mode to be usable when the battery is completely empty. Indeed, if a mobile phone or a PDA is used as a contactless chip card to allow users to access a transport service, the access to this service must not depend on the state of the battery of the mobile phone or of the PDA.

Figure 1:
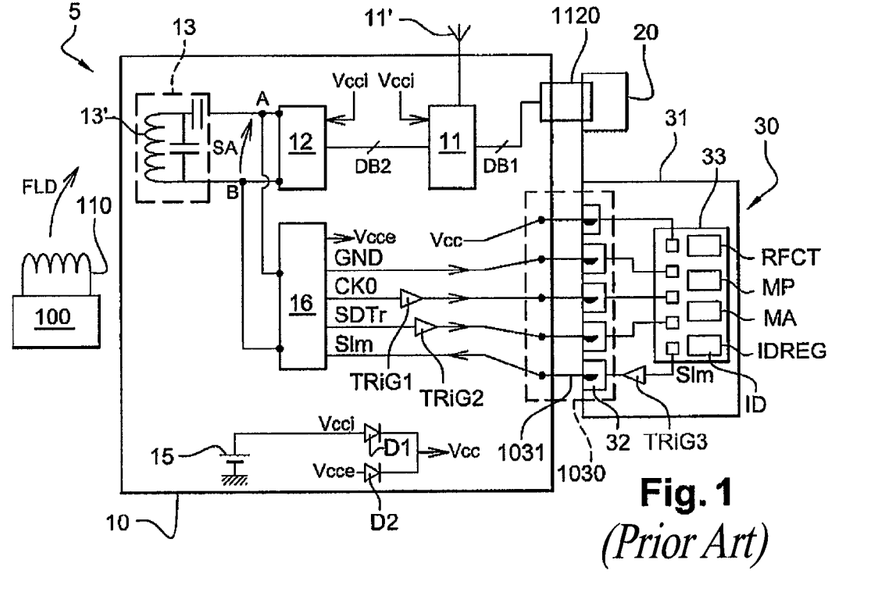
FIG. 1 previously described shows the architecture of an electronic system for mobile phone including a standard secure NFC reader, FIG. 2 previously described shows a standard link circuit supplying a composite signal to the removable security module of FIG. 1.

However, this purpose is more difficult to achieve with a NFC reader equipped with a removable security module than with a simple contactless chip card, for some reasons that will be understood by referring to FIG. 1.

FIG. 1 schematically shows the architecture of a standard electronic system 5 for mobile phones integrating a secure NFC reader. The telephony part of the system 5 comprises a baseband circuit 11 (standard GSM telephony circuit) equipped with a UHF antenna 11', and a SIM card 20 ("Subscriber Identification Module"). The circuit 11 is arranged on a mother board 10 and linked to the SIM card 20 by a serial data bus DB1, via a contact connector 1120 fixed to the mother board 10. Peripheral elements like the keyboard, the display and the body of the mobile phone are not shown.

The NFC reader comprises a reader circuit 12 mounted on the mother board 10, and an antenna circuit 13 having inputs A, B coupled to the reader circuit 12. The antenna circuit 13 comprises tuning capacitors and an antenna coil 13', and is tuned on a carrier frequency Fc, for example 13.56 MHz according to the ISO/IEC 14443 and ISO/IEC 15693 standards which are mentioned as examples only in the present application. The reader circuit 12, the baseband circuit 11 and the SIM card 20 are electrically powered by an internal continuous voltage Vcci supplied by a battery 15 of the mobile phone.

The active mode of the reader is implemented by the reader circuit 12 which is designed to apply a frequency excitation signal Fc to the antenna circuit 13, to modulate the amplitude of the excitation signal, to detect and demodulate a load modulation signal, in order to exchange data with a contactless integrated circuit or a NFC reader in passive mode. In addition, the material resources of the circuit 11 (microprocessor, program memory, etc) are used to manage the applications in active mode, thanks to "applets" (application programs) saved in this circuit. The reader circuit 12 is thus linked to the baseband circuit 11 by a data bus DB2, generally of the type I2C ("Inter Integrated Circuit") or SPI ("Serial Peripheral Interface").

The secure emulation mode of the NFC reader is implemented by adding to these elements a passive interface circuit 16 and a removable security module 30 of the type mentioned above. The passive interface circuit 16 is arranged on the mother board 10 and the module 30 is linked to the circuit 16 by means of a contact connector 1030 attached to the mother board.

The passive interface circuit 16 is coupled to the antenna circuit 13, in parallel with the reader circuit 12. In presence of an alternating magnetic field FLD emitted by another reader 100 (schematically shown in FIG. 1), an antenna signal SA oscillating at a carrier frequency Fc appears at the terminals of the antenna circuit 13, by inductive coupling between the antenna coil 13' and an antenna coil 110 of the other reader. The circuit 16 then extracts from the antenna signal a continuous voltage Vcce, a data signal SDTr and a primary clock signal CK0 of frequency Fc.

The clock signal CK0 and the data signal SDTr are sent to the module 30 through amplifier circuits TRIG1, TRIG2 (for example Schmitt triggers) which shape these signals. Similarly, the module 30 supplies a load modulation signal SIm which is shaped by an amplifier circuit TRIG3 before going through the connector 1030 so as to be applied to the load modulation switch SWIm.

Lastly, a voltage Vcc and an electrical potential reference GND (ground) are supplied to the module 30 via the connector 1030. More particularly, the voltage Vcc is supplied by a selection circuit receiving the extracted voltage Vcce and the internal voltage Vcci. The selection circuit is for example a diode circuit D1, D2 supplying the voltage Vcci when the voltage Vcce is absent or inferior to Vcci (ignoring the drop of voltage in the diodes D1, D2), if not, supplying the voltage Vcce.

The module 30 comprises a support 31, contact pads 32 onto which lean contact blades 1031 of the connector 1030, and a secure integrated circuit 33 embedded in the support 31 and having metallized contacts electrically linked to the contact pads 32. The integrated circuit 33 comprises a circuit RFCT, a microprocessor MP, a memory array MA and an identification register IDREG. The register IDREG comprises at least an anticollision identifier ID intervening during the opening of a RF transmission channel. The circuit RFCT comprises circuits for decoding the incoming data signal SDTr and coding the outgoing load modulation signal SIm. The memory array MA comprises programs for opening a RF transmission channel in passive mode and programs for managing one or more applications. The microprocessor MP is thus able to open a RF transmission channel in passive mode by exchanging RF frames with the reader 100, and by ensuring in particular the management of the initialization and anticollision steps. Once the transmission channel is opened, the microprocessor is able to manage a secure application by using the RF channel as means of transmission of application data. Similarly, the reader 100 comprises a software layer ensuring the opening of the RF transmission channel and a software layer ensuring the management of the application. The microprocessor MP can comprise various peripheral circuits, like a cryptography circuit and a random number generator, to allow it to manage the security aspects of the application.

For the NFC reader to operate in a completely passive way in emulation mode (the reader circuit 11 being powered off), the voltage Vcce and the current supplied by the passive interface circuit 16 must be sufficient to electrically power the circuits TRIG1, TRIG2, TRIG3 and the module 30.

However, this NFC reader consumes a non-negligible current, generally about a few milliamperes. This current considerably reduces the maximum communication distance with the reader 100, in relation to the one offered by a contactless chip card (the electric power recovered by inductive coupling depending on the inductive coupling ratio which varies with the communication distance). Thus, when the maximum communication distance is imposed by the specifications of the application and is superior to the possibilities of the reader, the emulation mode can only be implemented by taking some current from the battery 15 of the device.

Figure 2:
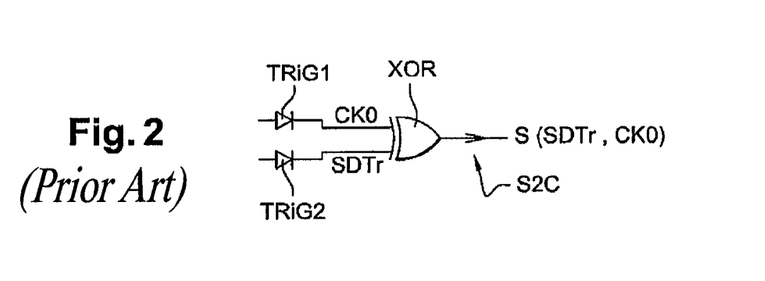

In an embodiment shown in FIG. 2, the clock CK0 and data SDTr links are replaced by a unique link called "interface S2C", which carries a data and clock carrier PSK-modulated (Phase Shift Keying) composite signal S(SDTr, CK0). The composite signal is supplied by a XOR gate which combines the signals CK0, SDTr supplied by the circuits TRIG1, TRIG2. This unique link is for example described in the document entitled "S2C Interface for NFC, Adding a general purpose interface between NFC and Secure IC to Secure NFC, 21-01-2005, Survey V1.00" (http://www.semiconductors.philips.com/acrobat/other/identification/S2C_survey_10.pdf).

However, this embodiment does not solve the problem of electrical overconsumption, the voltage Vcce and the current supplied by the passive interface circuit 16 further having to electrically power the XOR gate.

According to the observations, it appears that the amplifier circuits TRIG1, TRIG2, TRIG3 consume a large part of the electric energy extracted from the antenna circuit by the passive interface circuit 16, for example 30 to 50% of this energy. Indeed, these circuits must supply an output voltage and current sufficient to compensate electrical loss appearing in signals CK0 and SDTr when they go through the connector 1030, because of the connector stray capacitances which appear in particular between the contact blades 1031 of the connector and the contact pads 32 of the module 30. In addition, the electrical consumption of the circuit TRIG1 is high because the circuit switches at a high frequency, that is 13.56 MHz.

BRIEF SUMMARY

One embodiment provides an architecture of a NFC reader having a low electrical consumption in the emulation mode.

Another embodiment provides a NFC reader able to operate autonomously in emulation mode while offering a satisfactory communication distance.

One embodiment provides, in the fixed part of the reader (the mother board in the example above), and for example in the immediate proximity of the passive interface circuit, an emulation circuit able to ensure the opening of a RF transmission channel without the intervention of the removable security module, and which, after opening the RF transmission channel, transfers application data to the removable security module.

More particularly, an embodiment provides an inductive coupling reader comprising a passive interface circuit for modulating the impedance of an antenna circuit and extracting from the antenna circuit a data signal and a RF clock signal, means for coupling the reader to a removable security module, an emulation circuit for opening a RF transmission channel with another reader, transferring to the removable security module application data received through the RF transmission channel, and sending in the RF transmission channel application data received from the removable security module, a non-removable electrical link linking the emulation circuit to the passive interface circuit, by which the data signal and the RF clock signal are supplied to the emulation circuit, and a data bus clocked by a bus clock signal which frequency is inferior to the frequency of the RF clock signal, for linking the emulation circuit to the removable security module.

According to one embodiment, the passive interface circuit and the emulation circuit are arranged on a same semi-conductor chip.

According to one embodiment, the emulation circuit comprises an identification register comprising at least one identifier used by the emulation circuit for identifying the reader during the opening of the RF transmission channel.

According to one embodiment, the emulation circuit comprises a buffer memory for memorizing application data received via the RF transmission channel, before transferring them to the removable security module.

According to one embodiment, the buffer memory comprises at least one FIFO buffer comprising an input receiving data received via the RF transmission channel and an output linked to the data bus for sending these data to the removable security module.

According to one embodiment, the passive interface circuit extracts from the antenna circuit a continuous supply voltage, the emulation circuit and the removable security module being exclusively powered by this continuous voltage.

According to one embodiment, the data bus is a bus ISO 7816.

According to one embodiment, the bus clock signal has a frequency at least 25 times inferior to the frequency of the RF clock signal.

According to one embodiment, the reader comprises a telephony circuit GSM linked to a SIM card via a data bus.

According to one embodiment, the SIM card and the removable security module form only one module.

According to one embodiment, the emulation circuit and the GSM telephony circuit access the removable security module by a common bus shared through a bus multiplexing circuit.

One embodiment also relates to a portable device of the type PDA or mobile phone, comprising a reader according to an embodiment.

One embodiment also relates to a method for implementing a passive operating mode in an inductive coupling reader comprising a passive interface circuit and a removable security module, the passive interface circuit being provided for modulating the impedance of an antenna circuit and extracting from the antenna circuit a data signal and a RF clock signal, the removable security module being provided for managing a secure application, the method comprising: providing an emulation circuit distinct from the removable security module and coupling the emulation circuit to the passive interface circuit through a non-removable electrical link by which the data signal and the RF clock signal are supplied to the emulation circuit, opening a RF transmission channel by the emulation circuit, transferring to the removable security module application data received by the emulation circuit through the RF transmission channel, and sending in the RF transmission channel application data received from the removable security module by the emulation circuit, and linking the emulation circuit to the removable security module by a data bus clocked by a bus clock signal which frequency is inferior to the frequency of the RF clock signal.

According to one embodiment, the passive interface circuit and the emulation circuit are arranged on a same semi-conductor chip.

According to one embodiment, the method comprises providing, in the emulation circuit, an identification register comprising at least one identifier usable by the emulation circuit for identifying the reader during the opening of the RF transmission channel.

According to one embodiment, the method comprises providing, in the emulation circuit, a buffer memory for memorizing application data received via the RF transmission channel, before transferring them to the removable security module.

According to one embodiment, the method comprises providing, in the emulation circuit, at least one FIFO buffer comprising an input receiving data received via the RF transmission channel and an output linked to the data bus for sending these data to the removable security module.

According to one embodiment, the method comprises extracting a continuous supply voltage from the antenna circuit and applying this voltage to the emulation circuit and to the removable security module as exclusive supply voltage.

According to one embodiment, the data bus used is a bus ISO 7816.

According to one embodiment, the bus clock signal has a frequency at least 25 times inferior to the frequency of the RF clock signal.

According to one embodiment, the reader is associated to a GSM telephony circuit linked to a SIM card, and the SIM card and the removable security module form only one module.

According to one embodiment, the method comprises providing a common bus shared by the emulation circuit and the GSM telephony circuit for accessing the removable security module.

One embodiment also relates to an inductive coupling reader in the form of an integrated circuit on a semi-conductor chip, comprising a first port for coupling the integrated circuit to an antenna circuit and a second port for coupling the integrated circuit to a removable security module, a passive interface circuit for modulating the impedance of an antenna circuit and extracting from the antenna circuit a data signal and a RF clock signal, an emulation circuit for opening a RF transmission channel with another reader, then transferring to the second port application data received through the RF transmission channel, and sending in the RF transmission channel application data received via the second port, and a non-removable electrical link linking the emulation circuit to the passive interface circuit, by which the data signal and the RF clock signal are supplied to the emulation circuit.

According to one embodiment, the emulation circuit comprises an identification register comprising at least one identifier used by the emulation circuit for identifying the reader during the opening of the RF transmission channel.

According to one embodiment, the emulation circuit comprises a buffer memory for memorizing application data received via the RF transmission channel, before transferring them to the second port.

According to one embodiment, the buffer memory comprises at least one FIFO buffer comprising an input receiving data received via the RF transmission channel and an output linked to the second port for sending these data to the removable security module.

According to one embodiment, the passive interface circuit comprises a circuit for extracting from the antenna circuit a continuous supply voltage, and the emulation circuit and the removable security module are exclusively powered by this continuous voltage.

According to one embodiment, the reader further comprises a contactless chip reader circuit, arranged for applying to the first port a signal for exciting the antenna circuit, and a third port linked to the reader circuit, for coupling the integrated circuit to an external circuit for controlling the reader circuit.

According to one embodiment, the reader comprises a bus management circuit linked to the second port, and a circuit for extracting from the RF clock signal a bus clock signal which frequency is inferior to the frequency of the RF clock signal, and applying the bus clock signal to the bus management circuit.

According to one embodiment, the bus management circuit ensures a bus management ISO 7816.

According to one embodiment, the circuit for extracting from the RF clock signal a bus clock signal is arranged for supplying a bus clock signal which frequency is at least 25 times inferior to the frequency of the RF clock signal.

According to one embodiment, the reader comprises a bus multiplexing circuit having an output linked to the second port, a first input linked to the bus management circuit, and a second input linked to a fourth port of the integrated circuit.

BRIEF DESCRIPTION OF THE SEVERAL VIEWS OF THE DRAWING(S)

These and other features will be described in greater detail in the following description of one or more embodiments, given in relation with, but not limited to the following figures.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 3:
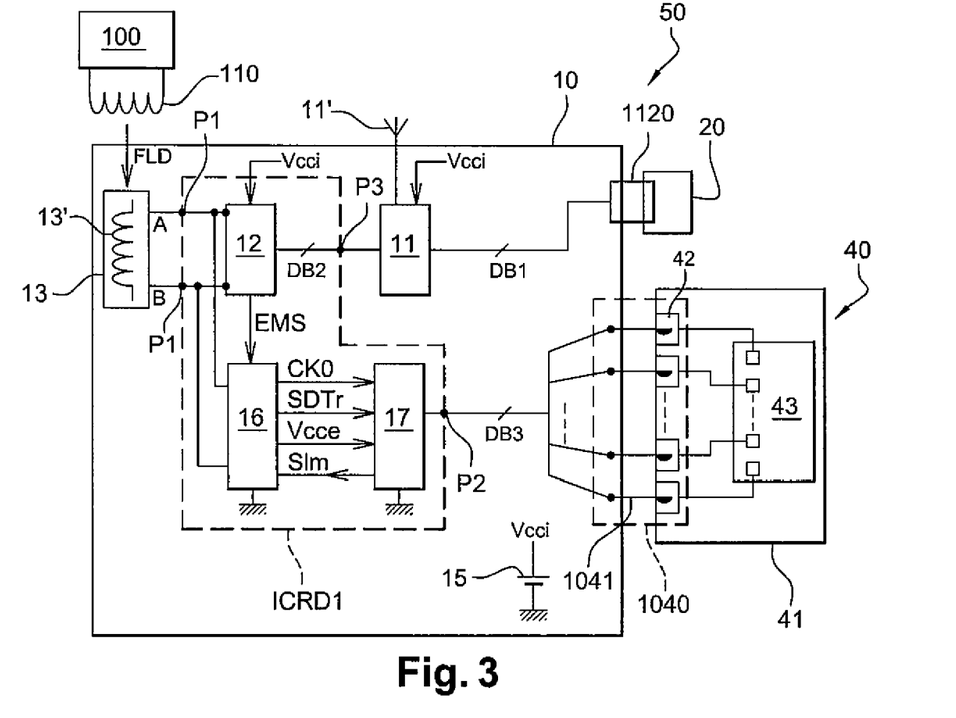
FIG. 3 shows the architecture of an electronic system for mobile phone including a secure NFC reader comprising an emulation circuit according to one embodiment.

FIG. 3 schematically shows the architecture of an electronic system 50 for a mobile phone incorporating a NFC reader according to one embodiment.

The telephony part of the system 50 comprises the elements already described in relation with FIG. 1, indicated by the same references, e.g., the baseband circuit 11, the UHF antenna 11' and the SIM card 20. As previously described, the circuit 11 is arranged on a mother board 10 and is linked to the SIM card 20 by a data bus DB1 via a contact connector 1120. Peripheral elements like the keyboard, the display and the body of the mobile phone are not shown.

The NFC reader according to one embodiment comprises, like the reader in FIG. 1, a reader circuit 12 mounted on the mother board 10 and an antenna circuit 13 tuned on a carrier frequency Fc, for example 13.56 MHz. The antenna circuit 13, although shown here on the mother board 10, can be arranged in any other location of the telephone body. Classically, the reader circuit 12 applies an excitation signal to the antenna circuit 13 and is controlled by the baseband circuit 11 by means of a data bus DB2. These elements are electrically powered by an internal continuous voltage Vcci supplied by a battery 15 of the mobile phone.

The implementation of the emulation mode of the NFC reader is ensured by a passive interface circuit 16, described above under the same reference, an emulation circuit 17 according to one embodiment, a removable security module 40 comprising a secure integrated circuit 43 embedded in a support. The electrical link between the circuit 17 and the secure integrated circuit 43 is ensured by a contact connector 1040 comprising contact blades 1041 linked to the circuit 17, leaning on the contact pads 42 of the support 41, which are linked to metallized contacts of the secure integrated circuit 43.

Figure 4:
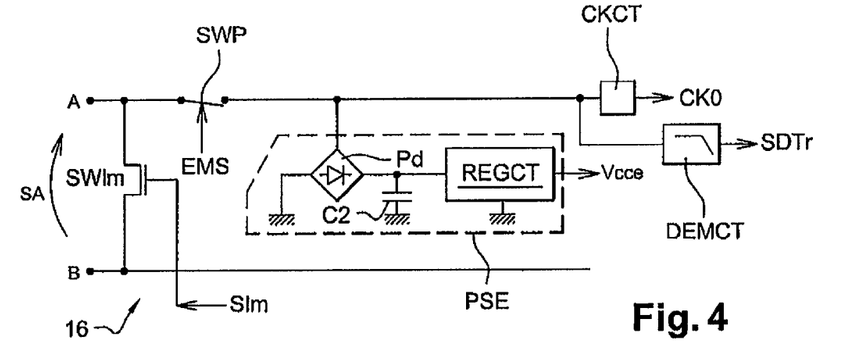
FIG. 4 shows an embodiment of a passive interface circuit shown in block form in FIG. 3.

The passive interface circuit 16, arranged on the mother board, is coupled to the antenna circuit 13 in parallel with the reader circuit 12. As shown in FIG. 4, the passive interface circuit 16 of one embodiment comprises a load modulation switch SW1m, a switch SWP, a demodulation circuit DEMCT, a clock extraction circuit CKCT and a power supply extraction circuit PSE. The circuit PSE comprises for example a diode rectifier Pd (diode bridge), a smooth capacitor Cs and a regulation circuit REGCT.

The switch SWP is driven by a signal EMS sent by the reader circuit 12 to open the switch and disconnect the circuits PSE, DEMCT, CKCT from the antenna circuit 13 when the reader circuit 12 applies the excitation signal to the antenna circuit. The switch of one embodiment is of the normally closed type and is thus in the conducting state in the absence of the signal EMS, when the read circuit 12 is powered off.

When an alternating magnetic field FLD emitted by a reader 100 produces an alternating antenna signal SA of frequency Fc in the antenna circuit 13, the circuit PSE supplies a continuous voltage Vcce, the circuit DEMCT removes the carrier Fc included in the antenna signal SA and supplies a data signal SDTr representative of the envelope of the antenna signal (demodulated but non decoded raw data), and the circuit CKCT supplies a primary clock signal CK0 of frequency Fc.

Referring again to FIG. 3, it turns out that the clock CK0 and data SDTr signals are not directly sent to the module 40 but are intercepted by the emulation circuit 17 to be processed locally, conversely to prior art. In the same way, the load modulation signal SIm is not sent by the module 40 but is emitted by the emulation circuit 17. In addition, the emulation circuit 17 is linked to the interface circuit 16 by fixed conductors forming a non-removable permanent electrical link.

In one embodiment, the circuits 16 and 17 are made under the form of an integrated circuit ICRD1 on a semi-conductor chip, so that the link conductors are short. Thus, no connector interposes between the circuits 16 and 17, the signals CK0, SDTr pass between the circuits 16 and 17 alongside short conductor lines which impedances are perfectly mastered, and there are few capacitive losses. No circuit is thus necessary to transfer the signals SDTr and Ck0. Incidentally, the reader circuit 12 is also integrated on this semi-conductor chip, which then forms a NFC reader under the form of an integrated circuit able to be easily arranged in a mobile phone or any other device.

When the reader 100 emits an interrogation command or an inventory command to search its communication area, the emulation circuit 17 responds to the request and performs the steps of initializing a contactless communication, included the anticollision steps, by emulating the operation or "behavior" of a contactless integrated circuit up to the opening of a RF transmission channel with the reader 100. The module 40 is thus relieved from the management of the RF protocol and is only in charge of managing the application layer (private protocol).

When the RF transmission channel is open, the emulation circuit 17 goes in a transparent state with regards to blocks of application data which go through the RF transmission channel: it passes application data sent by the reader 100 to the module 40 or passes application data sent by the module 40 on to the reader 100.

In addition, according to one embodiment, the application data are sent to the module 40 by means of a serial data bus DB3 of the master/slave type which goes through the connector 1040 and is clocked by a clock signal which frequency is inferior to the frequency Fc of the primary clock signal CK0. Therefore, the bus DB3 is controlled by electronic elements which do not switch at a RF frequency and thus consume little current.

This architecture of NFC reader with fragmentation of the function of RF channel management (emulation circuit 17) and of the function of application management (module 40), and use of a non-RF data bus, offers a clear advantage regarding the electrical consumption of the NFC reader, in relation to the reader architecture shown in FIG. 1.

The NFC reader, if it is made under the form of integrated circuit ICRD1 as indicated by a dotted line in FIG. 3, thus comprises a first port P1 for coupling the integrated circuit to the antenna circuit 13, a second port P2 for coupling the bus DB3 to the integrated circuit, and a third port P3 for coupling the bus DB2 to the integrated circuit. A part of the antenna circuit, particularly the tuning capacitors, can possibly be integrated on the semi-conductor chip (according to the technology used). In that case, the antenna circuit to be coupled to the integrated circuit can only comprise the antenna coil, or the antenna coil and other components which have not been integrated on the semi-conductor chip.

The continuous voltage Vcce supplied by the interface circuit 16 is here directly applied to the emulation circuit 17 and exclusively ensures its power supply. This voltage Vcce is also supplied to the module 40 via bus DB3 and also ensures the power supply of the module 40. In these conditions, the part of the NFC reader ensuring the emulation mode, that is the emulation circuit 17 and the module 40 (the passive interface circuit 16 not requiring to be powered) is self-powered by the external magnetic field FLD.

Figure 5:
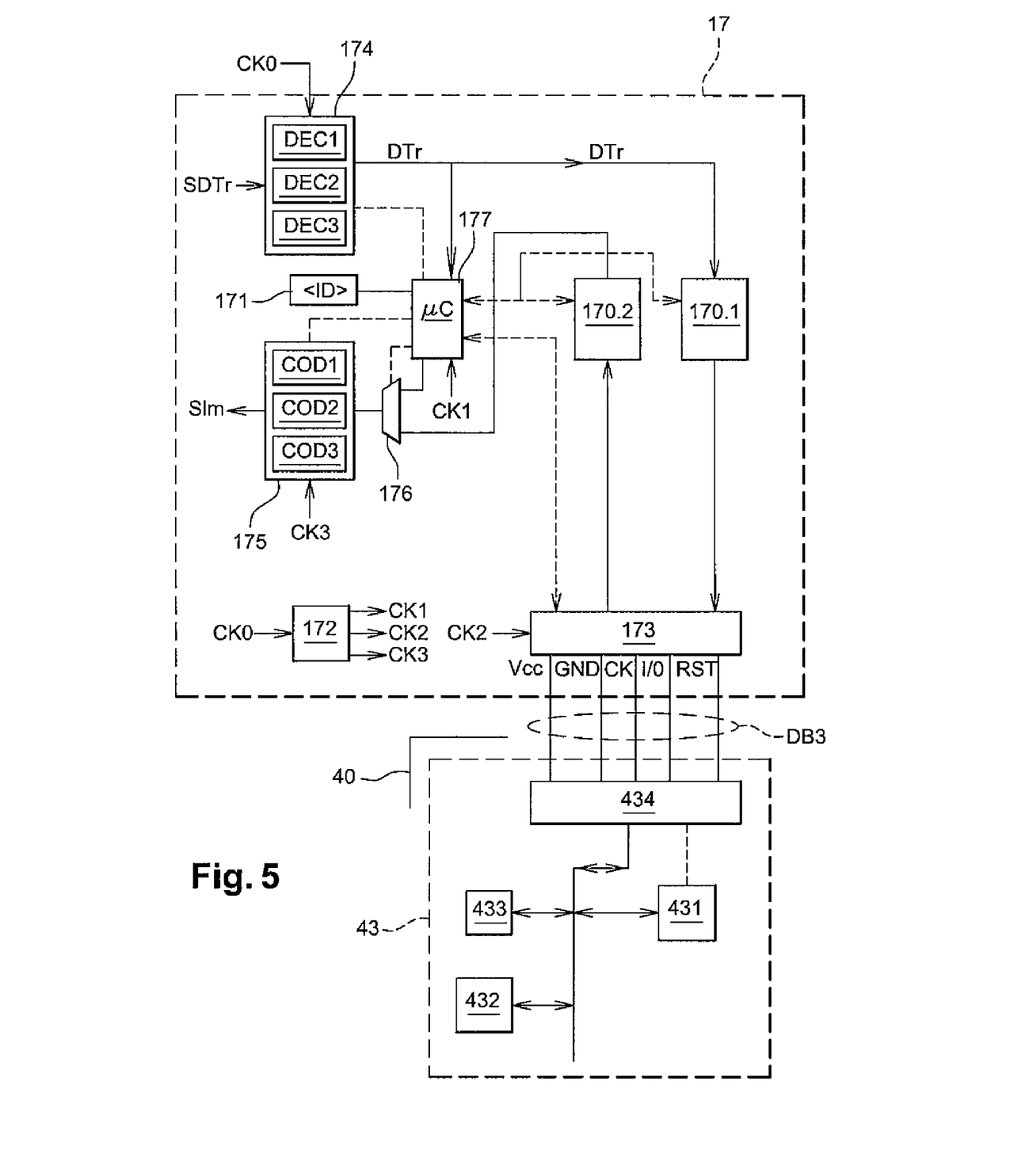
FIG. 5 shows in block form an embodiment of the emulation circuit.

An embodiment of the emulation circuit 17 is shown in FIG. 5, as well as an example architecture of the secure integrated circuit 43.

The secure integrated circuit 43 comprises a microprocessor 431, a memory array 432, a peripheral circuit for security management 433, including for example cryptography circuits and/or circuits for protecting passwords, and a bus management circuit 434 operating in slave mode. The memory array 432 comprises programs for managing at least one application, and unlike the prior art, does not comprise program for initializing a RF communication. In the same way, unlike the prior art, the secure integrated circuit 43 does not comprise anticollision identifier for RF communication protocol, nor coding and decoding circuit for opening a RF transmission channel.

The emulation circuit 17 of one embodiment comprises the following main elements:
- two FIFO buffers 170-1, 170-2 ("first in first out" buffers) forming a data buffer 170,
- an identification register 171,
- a clock generator 172,
- a bus management unit 173,
- a decoding circuit 174, and
- a coding circuit 175.

These elements are controlled by a control unit 177 (UC) by means of various control signals schematically shown by links in dotted lines. Since these elements being of a complex structure, only their function will be described below. Here, the emulation circuit 17 is assumed to be a multiprotocol circuit compatible with the protocols ISO/IEC 14443 type A, ISO/IEC 14443 type B and ISO/IEC 15693. Compatibility with other protocols, or even with one protocol only, can be provided.

Identification Register 171

The register 171 comprises at least one anticollision identifier ID which forms the unique identifier "UID" according to ISO/IEC 14443-3/A or ISO/IEC 15693 (diversified fixed number) and the identifier "PUPI" (pseudo-unique identifier) according to ISO/IEC 14443-3/B. If it is wanted to provide an identifier "PUPI" different from the UID and dynamically generated, instead of providing a diversified fixed number, the register 171 can comprise a non-volatile part (ROM) into which the UID is stored when the circuit is set up (personalization step) and a volatile part linked to means for generating a random or pseudo-random "PUPI".

Clock Generator 172

The clock generator 172 is a frequency divider which receives the primary clock signal CK0 and supplies signals CK1, CK2, CK3 which frequencies are inferior to the frequency Fc. The signal CK1 is applied to the control unit 177 as a sequencing clock signal. The signal CK2 is applied to the bus management unit 173 as bus clock signal, and the signal CK3 is applied to the coding circuit 175 as frequency subcarrier signal Fsc.

Decoding Circuit 174 and Coding Circuit 175

The decoding 174 and coding 175 circuits are standard circuits of the type used in contactless integrated circuits. The emulation circuit 17 substantially having the same function as a contactless integrated circuit regarding the RF connection, the communication interfaces of low level like coders and decoders do not require particular modification in relation to the state of the art.

The decoding circuit 174 comprises three decoders in parallel DEC1, DEC2, DEC3, each receiving the data signal SDTr and each performing a decoding operation in accordance with one of the aforementioned standards, the decoder DEC1 ensuring a decoding according to ISO/IEC 14443-A, the decoder DEC2 ensuring a decoding according to ISO/IEC 14443-B and the decoder DEC3 ensuring a decoding according to ISO/IEC 15693. When the data signal SDTr is received, the decoder to be used is determined by selecting, at the output of the decoding circuit 174, the output of the decoder not supplying an error signal. The decoder supplies an incoming data signal DTr originated from the coded data signal SDTr. Each decoder classically comprises a bit decoding stage, a word decoding stage, and a frame decoding stage.

For better understanding, it will be reminded that the standard ISO/IEC 15693 used in the so-called "long range" applications provides in particular a bit coding by pair of bits and by pulse position, a pulse being formed by holes of magnetic field able to occupy four positions in temporal segments. This protocol offers a quite low data speed of about 26 kbit/s but a high communication distance of several tens of centimeters, and that may reach one meter. In addition, ISO/IEC 14443-A provides a bit coding of the Modified Miller type and a modulation of the magnetic field amplitude at 100% (ASK modulation), and ISO/IEC 14443-B provides a bit coding of the NRZ type and a modulation of the magnetic field amplitude at 10%, each of these options offering a higher data speed of 106 kbit/s, 212 kbit/s or 424 kbit/s, but a shorter communication distance.

Similarly, the coding circuit 175 comprises three coders in parallel COD1, COD2, COD3, one of them being activated by the control unit 177 according to the type of coding of incoming data, identified by the decoder 174. The coders receive data selected by a multiplexer 176, and supply the load modulation signal SIm which is applied to the switch SWIm of the interface circuit 16 (FIG. 4). Each coder is provided for coding outgoing data in accordance with one of the aforementioned standards and comprises a bit coding stage, a word coding stage and a frame coding stage.

It will be also reminded that the standard ISO/IEC 14443-A provides a bit coding by load modulation using a frequency subcarrier Fc/16 and a Manchester coding, whereas the standard ISO/IEC 14443-B provides a bit coding of the BPSK type (Binary Phase Shift Coding) with Non-Return-to-Zero (NRZ), also by means of a frequency subcarrier Fc/16. Here, this subcarrier is the signal CK3, which is supplied to the coding circuit 175 by the clock generator 172. In addition, the standard ISO/IEC 15693 provides a first load modulation mode using a frequency subcarrier Fc/32 (423 KHz) and a second load modulation mode using two frequency subcarriers Fc/32 and Fc/28, respectively.

Bus Management Unit 173

The bus management unit 173 ensures the management of the bus DB3 as master device. It receives on its input data present in the buffer 170-1 and sends them on the bus DB3 upon decision of the control unit 177. On the other side of the bus, in the secure integrated circuit 43, the bus management unit 434 ensures the reception of data. The unit 173 also ensures the data transfer that the secure integrated circuit 43 sends to the reader 100 during an application session. These data are applied by the unit 173 to the input of the FIFO buffer 170-2. In the embodiment shown in FIG. 5, the bus DB3 is of the ISO/IEC 7816 type and comprises a wire Vcc, a wire GND (ground wire), a wire CK (clock wire), a wire I/O (bi-directional data wire) and a wire RST ("Reset").

The unit 173 applies on the wire Vcc the voltage Vcce supplied by the passive interface circuit 16, and the voltage Vcce is used by the integrated circuit 43 as supply voltage, as indicated above. In addition, the unit 173 applies on the wire CK the clock signal CK2 as bus clock signal, to clock the data transfer.

According to one embodiment, the frequency of the clock signal CK2 is set by the clock generator 172 according to the protocol used by the RF transmission channel. Thus, if the RF transmission channel has been opened according to the ISO/IEC 15693 protocol, the signal CK2 is set around 26 KHz corresponding to the 26 kbit/s offered by the RF transmission channel. If the RF transmission channel has been opened according to the ISO/IEC 14443 protocol, A or B type, the signal CK2 is set around 106 KHz corresponding to the 106 kbit/s offered by the RF transmission channel.

Control Unit 177 and FIFO Buffers 170-1, 170-2

The control unit 177 is the core of the emulation circuit 17, the peripheral elements described above being standard regarding the function, as underlined above.

Rather than a microprocessor, the control unit of one embodiment is a wired-logic finite state machine, so that the emulation circuit has a low electrical consumption. The control unit being dedicated to the establishment of a RF transmission channel, the transition states and conditions between these states are defined by the aforementioned standards (Cf. for example 14443-3/A FIG. 6 "type A proximity card state diagram" and 14443-3/B FIG. 19 "proximity card state transition flow chart").

Figure 6:
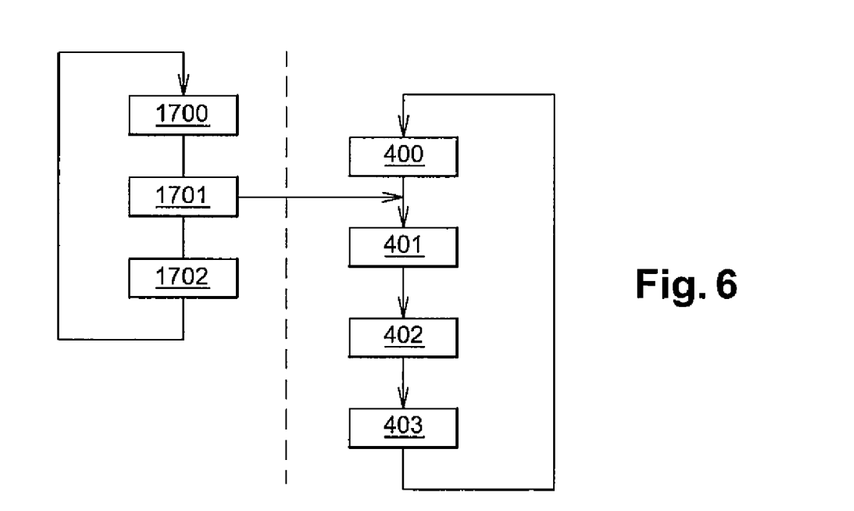
FIG. 6 is a diagram showing the operation of the emulation circuit according to an embodiment.

The control unit 177 of one embodiment is configured to carry out the following steps, shown by a chart in FIG. 6:

Step 1700: intercepting the whole incoming data stream DTr (output of the decoder 174) as long as it relates to the initialization of a communication with the reader 100, processing the anticollision commands sent by the reader 100, and generating the responses to these commands, Step 1701: when the RF transmission channel is open, opening an internal transmission channel with the module 40, via the bus DB3, by means of the bus management unit 173, then sending in the internal transmission channel, transparently, the incoming application data received via the RF transmission channel, and sending to the reader 100, in the RF transmission channel, the outgoing application data received from the module 40 via the internal transmission channel.

Step 1702: detecting a command of end of communication (for example a deselection command) and stopping sending data.

The function allotted to the control unit 177 is here implemented by using the FIFO buffer 170-1 for blocking or conversely transmitting in the internal transmission channel the incoming data, and by using the FIFO buffer 170-2 and the multiplexer 176 for sending in the RF transmission channel the application data received via the internal transmission channel. To that purpose, the output of the decoding circuit 174 is linked both to the input of the FIFO buffer 170-1 and to the input of the control unit 177. The output of the FIFO buffer 170-2 is linked to a first input of the multiplexer 176 and the control unit 177 is linked to a second input of the multiplexer. The multiplexer is driven by the control unit 177 and is used to apply to the input of the coding circuit 175 control data that the unit 177 emits (responses to initialization and anticollision commands of the RF transmission channel) or to apply to the input of the coding circuit 175 application data received from the module 40 and stored in the FIFO buffer 170-2.

Regarding the incoming data, the control unit 177 of one embodiment is here configured to perform the following actions:

1) analyzing all the incoming data, blocking the FIFO buffer 170-1 and inhibiting the bus DB3 as long as the RF transmission channel is not open, decoding the initialization and anticollision commands contained in these data, executing the commands by sending responses via the coding circuit 175, 2) when the transmission channel is open, blocking the FIFO buffer 170-1 while control data are received, activating the FIFO buffer 170-1 when application data are received, and activating the bus DB3 so that the data are sent to the module 40.

Regarding the outgoing application data, emitted by the module 40, the control unit 177 of one embodiment is here configured to perform the following actions:

1) placing the bus DB3 in reception configuration, and activating the buffer 170-2 to store application data, 2) while the application data are received in the buffer 170-2, generating start of frame (or block) data which must precede application data and applying them to the coding circuit 175, then applying to the coding circuit the application data present in the buffer 170-2, and then, if necessary, generating end of frame (or block) data and applying them to the coding circuit.

Steps of verifying error detection codes (CRC) present in the incoming data, of producing and inserting error detection codes in the outgoing data, are performed in one embodiment by the frame decoding and coding stages of the decoding and coding circuits 174, 175, respectively. In one embodiment, steps of detecting or inserting start of word bits and end of word bits are performed by word decoding and coding stages of the decoding and coding circuits 174, 175, respectively.

In brief, the control unit 177 differentiates the received commands which aim at opening the RF transmission channel and the application data blocks, and decides whether it processes these data or if it passes them on to the module 40.

On its side, the secure integrated circuit 43 of one embodiment ensures the control of the application layer from the application data transmitted by the control unit, by performing the following steps, also shown in FIG. 6:

Step 400: after powering on the integrated circuit 43 by the voltage Vcce extracted from the external magnetic field, waiting a first application command from the application layer, Step 401: receiving and processing application commands aiming at establishing a transaction. These commands can comprise any type of securisation command used in the known applications previously developed for contact cards, the RF transmission channel being transparent from the application point of view, and particularly authentication commands comprising random words, which responses use a cryptography algorithm proper to the secure integrated circuit 43.

Step 402: processing the transaction. It can be for example a transaction aiming at debiting a unit counter present in the memory array 432 of the integrated circuit, to allow a user to access a service (transport or other), Step 403: closing the transaction by means of an adapted command, specific to the application layer, and returning to the waiting step 400 if the integrated circuit 43 is still electrically powered.

At the step 1701, when the RF transmission channel is open, the control unit 177 can go on managing the parts of the data stream allowing the application data stream to be controlled. This is the case if, in accordance with the OSI model of the IUT-T (International Telecommunication Union), the session layer is combined with the data link layer, because the exchange of data blocks in one way or the other for transferring data of the application layer then requires at least the processing of control fields of the RF channel that will clearly appear below with the description of an example opening sequence of an application session according to ISO/IEC 14443-4/B, during which prologue and epilogue fields remain under the control of the control unit 177.

Figure 7:
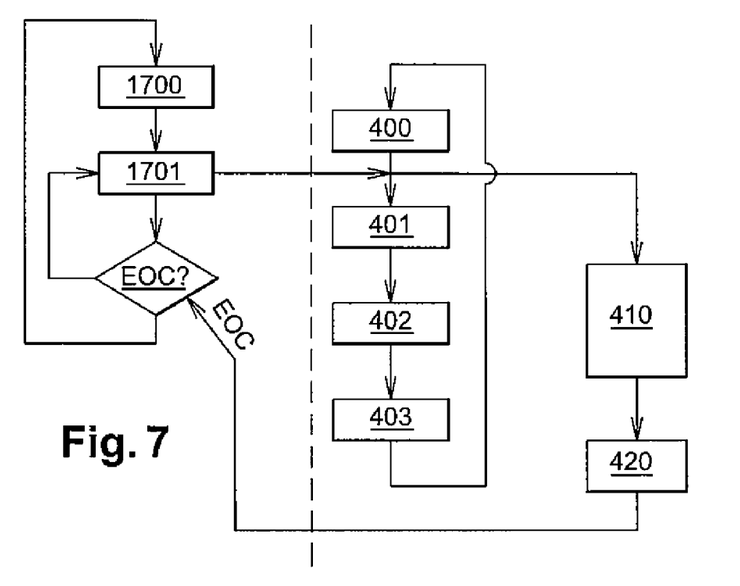
FIG. 7 is a diagram showing a variation of operation of the emulation circuit according to an embodiment.

In a variant shown in FIG. 7, the control of the data link layer after opening the RF transmission channel, that is the supervision of the RF transmission channel, is allotted to the removable security module 40. Thus, in parallel to the steps 401, 402, 403 the secure integrated circuit 43 processes data not belonging to the application layer and allowing the RF transmission channel to be managed. In that case, the emulation circuit 17 is completely transparent during the step 1701 and transmits all the data received (except error codes CRC if they are checked by the decoding circuit, as indicated above). In that case, a command of end of RF communication is decoded by the secure integrated circuit 43 during a step 420. The integrated circuit 43 then sends to the control unit 177 an end of session signal EOS, which leads the control unit to go back to step 1700.

Whatever the option retained, the control unit 177 decodes and analyzes on the fly the following commands present in the frames until the opening of the RF transmission channel. In the present embodiment where the emulation circuit complies with ISO/IEC 14443 and ISO/IEC 15693, these commands are the following:

| Commands ISO/IEC 14443-A | Commands ISO/IEC 14443-B | Commands ISO/IEC 15693 |
| --- | --- | --- |
| REQA WAKEUP ANTICOLL SELECT HALTA | REQB SLOTMARKER ATTRIB HALTB | INVENTORY STAYQUIET |

An initialization sequence of a RF transmission channel according to the standard ISO/IEC 14443/B is now going to be described by way of example. The reference signs decreed by the standard (commands and fields in the commands) are stated in inverted commas for distinguishing them from the reference signs of the present application.

Initialization of the RF Transmission Channel and Anticollision

Step A: the control unit 177 receives a 5-byte command "REQB" comprising a code "APf" (anticollision prefix), a code "AFI" (application family identification), a code "PARAM" (number of response slots). The two bytes "CRC-B" of the error detection field are processed by the decoder 174, for this command as well as for the following commands. Therefore, these bytes will no longer be mentioned below, nor the bytes "CRC-B" inserted in the responses.

Step B: it is here assumed that the control unit randomly calculates a position of response equal to 0 (immediate response) on the response scale specified by the code "PARAM", or that it is set in probabilistic and not pseudo-determinist mode (both options being provided by ISO/IEC 14443) and that it decides, at the end of a random choice process, to respond to this command. Thus, during step B, the control unit sends a response "ATQB" comprising the byte "50" (in hex notation), four bytes forming the "PUPI" (read in the identification register 171 and possibly randomly generated), four bytes of application data (not used here, the internal transmission channel not being open yet), and three bytes of protocol data.

Step C: the control unit receives the command "ATTRIB" comprising a byte equal to "1 D", the four bytes of the "PUPI", four parametrization bytes, and N bytes of superior layer. If N is different from 0, the field "bytes of superior layer" relates to the module 40 and it is sent to it via the bus DB3 after opening the internal transmission channel. The parametrization bytes define the delays of response to the commands, the suppression or not of the starts and ends of frames, "SOF" and "EOF", (information communicated to the decoding 174 and coding 175 circuits), the maximum frame size, and also comprise a card identifier CID allocated to the control unit for the RF communication session which opening is effective when the command "ATTRIB" is received.

If the reader 100 sends commands "SlotMarker" between the steps B and C or after the step C, to determine if other entities are in its communication area, the control unit does not respond to these commands after sending the message "ATQB".

Step D: the control unit responds to the command "ATTRIB" by sending a byte comprising the CID (card identification), and N bytes of superior layer (if they have been supplied by the module 40 via the internal transmission channel and are present in the buffer 170-2).

After responding to the command "ATTRIB", the control unit only responds to the application commands defined in ISO/IEC 14443-4, which include the unique CID, and only ensures the supervision of the RF transmission channel by transmitting the application data blocks to the module 40, and by sending in the RF channel the application data received from the removable module 40. However, a command "HLTB" (one byte equal to "50", four bytes "PUPI") received before the command "ATTRIB" places the control unit back to an initial state.

Supervision of the RF Transmission Channel

Here, the supervision of the transmission channel is assumed to be ensured by the control unit 177, according to the chart of FIG. 6. The supervision of the RF transmission channel here comprises the processing by the control unit of the prologue field (comprising the "CID" assigned by the command "ATTRIB") of the blocks "I" intended to convey the application data. The blocks epilogue field, or field "EDC", which comprises two bytes "CRC-B", is as previously generated by the decoding circuit (incoming blocks) or the coding circuit (outgoing blocks). The information field "INF" which allows the application data to be forwarded to the blocks "I", or control information to the blocks "S", is transmitted to the module 40 only if it is present in a block "I". Optionally, the blocks "S" can be used by the emulation circuit 173 to exchange control data with the reader 100, as well as the blocks "R" which make it possible to convey positive or negative acknowledgments of receipt and do not contain any field "INF".

The control unit closes the RF transmission channel upon reception of the command "DESELECT" which does not comprise any field "INF". The command "DESELECT" is coded like a protocol block "S". It is constituted of a request block "S(DESELECT)" sent by the reader 100 and of a response "S(DESELECT)" sent as acknowledgment of receipt by the control unit.

In the variant shown by the chart of FIG. 7, the processing of the prologue field of blocks "I" is ensured by the module 40, which has previously received from the control unit 177 the "CID" assigned by the reader 100.

In the light of the example which has just been described, it appears that the buffers FIFO are only provided for the sake of synchronization of the stream of incoming application data with the stream of outgoing application data. It is thus noted that suppressing the FIFO buffers, particularly the buffer 170-1, is conceivable if the frames synchronization is mastered for each communication protocol used. Likewise, the FIFO buffers can be replaced by any other type of buffer memory, while providing an adapted management of buffer memory.

Figure 8:
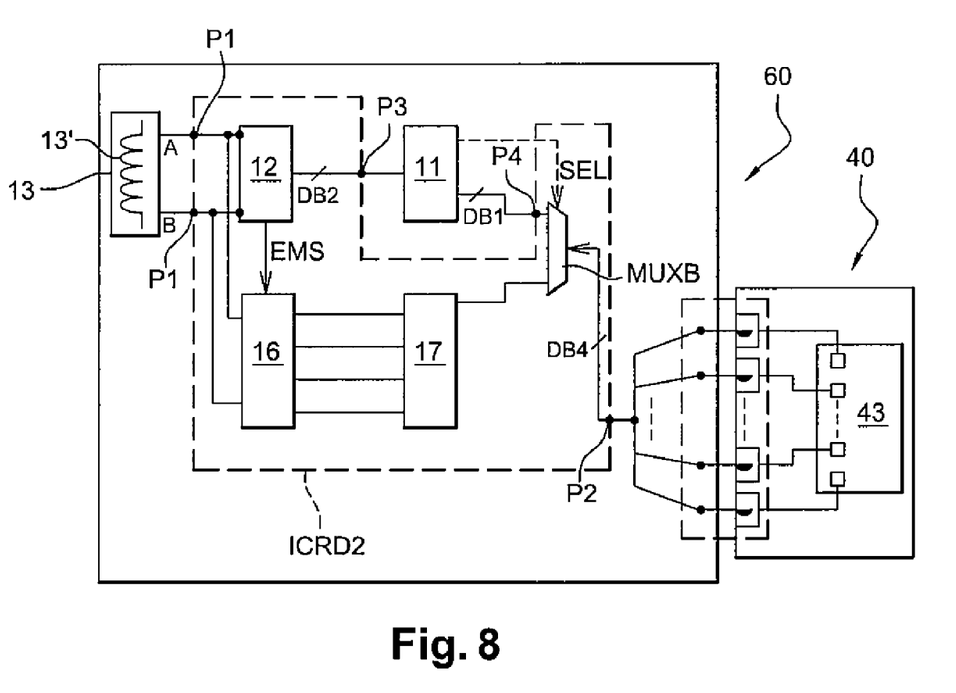
FIG. 8 shows another embodiment of the system of FIG. 5.

FIG. 8 schematically shows another embodiment 60 of the system 50 shown in FIG. 4. The system 60 differs from the system 50 by the fact that the SIM card 20 is suppressed and that the module 40 is used both as a module for securing applications performed by means of the RF transmission channel, as previously described, and as SIM card for securing telephony applications.

To that end, the bus DB1 of the baseband circuit 11 and the bus DB3 of the emulation circuit 17 are of the same type and are for example buses ISO/IEC 7816. The end of the bus DB1 is coupled to a first input of a bus multiplexer MUXB (input with several wires) and the end of the bus DB3 is coupled to a second input of the multiplexer MUXB. The output of the multiplexer MUXB is linked by a bus DB4 to the module 40 (that is, to the bus management unit 434 of the secure integrated circuit 43, Cf. FIG. 5). The multiplexer MUXB is controlled by a signal SEL which is for example supplied by the baseband circuit 11. The multiplexer links the bus DB3 to the module 40 when the signal SEL is for example equal to 1, and links the bus DB1 to the module 40 when the signal SEL is equal to 0. The priority is here given to the baseband circuit 11, which accesses as a priority to the module 40 as SIM card when a telephony application must be carried out and otherwise frees the bus DB4 to allow the module 40 to respond to a request for opening the application session received in the form of application data sent by the emulation circuit 17. However, a more complex management of priorities of access to the module 40 can be provided by providing an exchange of control signals between the baseband circuit 11 and the emulation circuit 17.

This embodiment of the NCF reader according to one embodiment can be embodied as previously in the form of an integrated circuit ICRD2, as shown in FIG. 8 by a dotted line. The integrated circuit ICRD2 thus comprises the port P1 for coupling the integrated circuit to the antenna circuit 13, the port P2 for coupling the bus DB4 to the output of the multiplexer MUXB (the bus DB3 being here internally linked to the input of the multiplexer MUXB, which is integrated on the chip), the port P3 for coupling the bus DB2 to the integrated circuit, and a fourth port P4 for coupling the bus DB1 to the input of the multiplexer MUXB.

Various embodiments and applications are possible. Particularly but not exclusively, the emulation circuit 17 can comprise other bus interfaces (bus management units) to be coupled to application management circuits arranged on the mother board. These application management circuits can be particularly provided for non-secure applications not requiring the intervention of the module 40. In addition, although an embodiment of a NFC reader in a system for mobile telephony has been described, the embodiments are not limited to this example. Thus, a NFC reader according to one embodiment, without telephony circuit, can also be made. The reader comes for example in the form of a portable device of small dimensions, comprising a case for receiving the removable security module 40, a display and a keyboard. This device is used, in active mode, to read contactless electronic tags, contactless electronic badges, and contactless visiting cards. In emulation mode, and even if the internal battery of the device has run down, the device remains usable as contactless chip card to access services, as electronic wallet, as access control means (for example door opening or contactless ignition key), etc.

In addition, the circuit 16 and the module 40 (FIGS. 3, 8) can also be electrically powered with a composite voltage as described above with reference to FIG. 1, becoming equal to the internal voltage Vcci when the communication distance becomes too long for the voltage Vcce to power these elements alone. However, even in these conditions, the embodiment has the feature of saving energy. Moreover, the voltage Vcce can be used to charge an auxiliary accumulator which will then be used as local power supply.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An inductive coupling reader, comprising:
    a passive interface to modulate an impedance of an antenna and to extract from the antenna a data signal and a radio-frequency clock signal;
    a security module interface configured to couple the reader to at least one removable security module including a Subscriber Identification Module (SIM) card;
    an emulator configured to open a radio-frequency transmission channel with another reader, to transfer to the removable security module interface application data received through the radio-frequency transmission channel, and to send in the radio-frequency transmission channel application data received through the security module interface;
    an electrical link coupling the emulator to the passive interface by which the data signal and the radio-frequency clock signal are supplied to the emulator;
    a baseband communication interface configured to couple the reader to at least one baseband device;
    an emulator data bus clocked by a bus clock signal, having a frequency inferior to a frequency of the radio-frequency clock signal and coupled to the emulator; and
    a common multiplexed bus coupled to the emulator data bus, to the baseband communication interface and to the security module interface, wherein the emulator and baseband device access the removeable security module through the common multiplexed bus.

2. The reader according to claim 1 wherein the passive interface and the emulator are arranged on a same semiconductor chip.

3. The reader according to claim 1 wherein the emulator includes an identification register having at least one identifier used by the emulator to identify the reader during opening of the radio-frequency transmission channel.

4. The reader according to claim 1 wherein the emulator includes a buffer memory configured to store application data received via the radio-frequency transmission channel, before transfer of said data to the removable security module interface.

5. The reader according to claim 4 wherein the buffer memory includes at least one first-in-first-out buffer having an input terminal configured to receive data received via the radio-frequency transmission channel and an output terminal linked to the emulator data bus to send these data to the security module interface.

6. The reader according to claim 1, further comprising a removeable security module coupled to the security module interface, wherein the passive interface is configured to extract from the antenna a continuous supply voltage, the emulator and the removable security module being exclusively powered by this continuous supply voltage.

7. The reader according to claim 1 wherein the emulator data bus includes an International Organization for Standardization (ISO) 7816 bus.

8. The reader according to claim 1 wherein the emulator bus clock signal has said frequency at least 25 times inferior to the frequency of the radio-frequency clock signal.

9. The reader according to claim 1 wherein the baseband communication interface is coupled to a Global System for Mobile Communications (GSM) telephony block configured to the SIM card.

10. A portable device of a personal digital assistant (PDA)-type or mobile phone, comprising a reader according to claim 1.

11. A method for implementing a passive operating mode in an inductive coupling reader having a passive interface and a removable security module, the passive interface being adapted to modulate an impedance of an antenna and to extract from the antenna a data signal and a radio-frequency (RF) clock signal, the removable security module including a Subscriber Identification Module (SIM) card and being adapted to manage a secure application, the method comprising:
    providing an emulator distinct from the removable security module and coupling the emulator to the passive interface through an electrical link by which the data signal and the RF clock signal are supplied to the emulator;
    opening a RF transmission channel using the emulator, transferring to the removable security module application data received by the emulator through the RF transmission channel, and sending in the RF transmission channel application data received from the removable security module by the emulator;
    linking the emulator to an emulator data bus clocked by a bus clock signal having a frequency inferior to a frequency of the RF clock; and
    coupling the emulator data bus and a baseband communication block to the removable security module through a common multiplexed bus, wherein the emulator and the baseband communication block access the removable security module through the common multiplexed bus.

12. The method according to claim 11 wherein the passive interface and the emulator are arranged on a same semiconductor chip.

13. The method according to claim 11, further comprising providing, in the emulator, an identification register having at least one identifier usable by the emulator to identify the reader during the opening of the RF transmission channel.

14. The method according to claim 13, further comprising providing, in the emulator, at least one first-in-first-out buffer having an input terminal to receive data received via the RF transmission channel and an output terminal linked to the data bus to send these data to the removable security module.

15. The method according to claim 11, further comprising providing, in the emulator, a buffer memory to store application data received via the RF transmission channel, before transferring said data to the removable security module.

16. The method according to claim 11, further comprising extracting a continuous supply voltage from the antenna and applying this voltage to the emulator and to the removable security module as exclusive supply voltage.

17. The method according to claim 11 wherein the emulator data bus used includes an International Organization for Standardization (ISO) 7816 bus.

18. The method according to claim 11 wherein the emulator bus clock signal has said frequency at least 25 times inferior to the frequency of the RF clock signal.

19. The method according to claim 11 wherein the baseband communication block is a Global System for Mobile Communications (GSM) telephony block linked to the SIM card.

20. An inductive coupling reader formed as an integrated circuit on a semi-conductor chip, the reader comprising:
    a first port configured to couple the integrated circuit to an antenna and a second port configured to couple the integrated circuit to a removable security module including a Subscriber Identification Module (SIM) card;
    a passive interface coupled to the first port and configured to modulate an impedance of the antenna and to extract from the antenna a data signal and a radio-frequency (RF) clock signal;
    an emulator coupled to the passive interface and configured to open a RF transmission channel with another reader, to transfer to the second port application data received through the RF transmission channel, and to send in the RF transmission channel application data received via the second port;
    a third port configured to receive control signals to control the reader; and
    a common multiplexed bus system coupled to the second port, to the emulator and to a fourth port of the integrated circuit, wherein the emulator and a baseband device coupled to the fourth port assess the removable security module through the common multiplexed bus system.

21. The reader according to claim 20 wherein the emulator includes an identification register having at least one identifier used by the emulator to identify the reader during opening of the RF transmission channel.

22. The reader according to claim 20 wherein the emulator includes a buffer memory to store application data received via the RF transmission channel, before transfer of said data to the second port.

23. The reader according to claim 22 wherein the buffer memory includes at least one first-in-first-out buffer having an input terminal to receive data received via the RF transmission channel and an output terminal coupled to the second port through the common multiplexed bus system.

24. The reader according to claim 20 wherein the passive interface includes a circuit to extract from the antenna a continuous supply voltage and wherein the emulator and the removable security module are configured to be exclusively powered by this continuous voltage.

25. The reader according to claim 20, further comprising a contactless chip reader arranged to apply to the first port a signal to excite the antenna.

26. The reader according to claim 20, further comprising a circuit to extract from the RF clock signal a bus clock signal having a frequency inferior to a frequency of the RF clock signal, and to apply the bus clock signal to an emulator bus coupling the common multiplexed bus system to the emulator.

27. The reader according to claim 26 wherein the emulator bus is an International Organization for Standardization (ISO) 7816 bus.

28. The reader according to claim 26 wherein the circuit to extract from the RF clock signal said bus clock signal is arranged to supply said bus clock signal having said frequency that is at least 25 times inferior to the frequency of the RF clock signal.

29. An apparatus, comprising:
    an antenna module;
    a first interface configured to couple to a baseband module;
    a passive interface coupled to said antenna module, and adapted to modulate an impedance of said antenna module and to extract from the antenna module a data signal and a radio-frequency (RF) clock signal;
    an emulator coupled to the passive interface to receive the data signal and the RF clock signal from the passive interface, the emulator being adapted to open a RF channel through which to carry application data; and
    a common multiplexed bus system configured to couple the emulator and the first interface to a second interface configured to couple to a removable security module including a Subscriber Identification Module (SIM), wherein the emulator and the baseband module access the removable security module through the common multiplexed bus system.

30. The apparatus of claim 29, further comprising an emulator data bus adapted to link said emulator to the common multiplexed bus system, wherein the emulator data bus is clocked by a bus clock signal having a frequency lower than a frequency of the RF clock signal.

31. The apparatus of claim 30 wherein said application data carried on said RF channel includes application data received through said RF channel and to be transferred to said second interface by said emulator, and application data received from said second interface by said emulator and to be sent in said RF channel.

32. The apparatus of claim 29 wherein the passive interface and the emulator are arranged on a same semi-conductor chip.

33. The apparatus of claim 29 wherein said emulator includes:
    an identification register having at least one identifier usable by the emulator to provide identification during opening of the RF channel; and
    a buffer memory to store application data received via the RF channel, before transfer of said data by said emulator.

* * * * *

UNITED STATES PATENT AND TRADEMARK OFFICE
CERTIFICATE OF CORRECTION

PATENT NO. : 7,975,921 B2  
APPLICATION NO. : 12/103570  
DATED : July 12, 2011  
INVENTOR(S) : Christophe Mani et al.

It is certified that error appears in the above-identified patent and that said Letters Patent is hereby corrected as shown below:

Column 18
Claim 9, line 31, "to the SIM card." should read as, --to couple to the SIM card.--.

Column 19
Claim 19, line 25, "Communications (GSM) telephony block linked tothe SIM" should read as, --Communications (GSM) telephony block linked to the SIM--.

Signed and Sealed this  
Eighteenth Day of October, 2011

David J. Kappos  
*Director of the United States Patent and Trademark Office*